United States Patent
Holmes et al.

(10) Patent No.: US 7,827,206 B2
(45) Date of Patent: Nov. 2, 2010

(54) SYSTEM AND METHOD FOR MANAGING CHANGES TO BUSINESS RULES

(75) Inventors: Peter Holmes, Poughkeepsie, NY (US); Joshy Joseph, Redmond, WA (US); Naveen Sachdeva, Sewickley, PA (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 11/267,782

(22) Filed: Nov. 3, 2005

(65) Prior Publication Data

US 2007/0100859 A1 May 3, 2007

(51) Int. Cl.
G06F 17/30 (2006.01)
(52) U.S. Cl. .......................................... 707/802; 705/7
(58) Field of Classification Search .............. 707/104.1, 707/100, 802; 705/7, 1
See application file for complete search history.

(56) References Cited

U.S. PATENT DOCUMENTS

| | | | |
|---|---|---|---|
| 6,016,477 A | 1/2000 | Ehnebuske et al. | |
| 6,263,498 B1 | 7/2001 | Alcorn et al. | |
| 6,473,748 B1 | 10/2002 | Archer | |
| 6,662,172 B1 * | 12/2003 | Smith | 706/47 |
| 6,745,382 B1 | 6/2004 | Zothner | |
| 6,751,657 B1 | 6/2004 | Zothner | |
| 6,775,658 B1 | 8/2004 | Zothner | |
| 6,789,252 B1 | 9/2004 | Burke et al. | |
| 6,856,980 B2 | 2/2005 | Feldman et al. | |
| 2002/0042782 A1 | 4/2002 | Albazz et al. | |
| 2002/0065701 A1 | 5/2002 | Kim et al. | |
| 2002/0161680 A1 | 10/2002 | Tarnoff | |
| 2002/0165986 A1 | 11/2002 | Tarnoff | |
| 2002/0169854 A1 | 11/2002 | Tarnoff | |
| 2002/0169865 A1 | 11/2002 | Tarnoff | |
| 2003/0046123 A1 * | 3/2003 | Chen | 705/7 |
| 2003/0149608 A1 | 8/2003 | Kall et al. | |
| 2003/0200130 A1 | 10/2003 | Kall et al. | |
| 2004/0030448 A1 | 2/2004 | Solomon | |
| 2004/0030449 A1 | 2/2004 | Solomon | |
| 2004/0030450 A1 | 2/2004 | Solomon | |
| 2004/0030451 A1 | 2/2004 | Solomon | |
| 2004/0030570 A1 | 2/2004 | Solomon | |
| 2004/0030571 A1 | 2/2004 | Solomon | |
| 2004/0054769 A1 | 3/2004 | Koops et al. | |
| 2004/0068351 A1 | 4/2004 | Solomon | |
| 2004/0068415 A1 | 4/2004 | Solomon | |
| 2004/0068416 A1 | 4/2004 | Solomon | |
| 2004/0134336 A1 | 7/2004 | Solomon | |
| 2004/0134337 A1 | 7/2004 | Solomon | |

(Continued)

*Primary Examiner*—James Trujillo
*Assistant Examiner*—Amresh Singh
(74) *Attorney, Agent, or Firm*—Schmeiser, Olsen & Watts; John R. Pivnichny (57) ABSTRACT

A rules change management system and method. The system comprises a first computing system comprising a first memory system. The first memory system comprises a rules change management engine. The first computing system receives a set of meta-rules associated with rules stored in a second memory system within a second computing system. The set of meta-rules are stored in the first memory system. The computing system receives a request to change a rule of the rules. The rules change management engine applies at least one associated meta-rule of the set of meta-rules to the request. The rules change management engine determines if the request may be executed based on the applying.

30 Claims, 4 Drawing Sheets

U.S. PATENT DOCUMENTS

2004/0196307 A1  10/2004  Zak et al.
2005/0043940 A1   2/2005  Elder
2006/0009991 A1*  1/2006  Jeng et al. ............. 705/1

* cited by examiner

SYSTEM AND METHOD FOR MANAGING CHANGES TO BUSINESS RULES

BACKGROUND OF THE INVENTION

1. Technical Field

The present invention relates to a system and associated method for managing changes to business rules.

2. Related Art

Determining acceptable changes to data within a system typically requires a complicated series of steps that produces undesirable results. Therefore there exists a need for a simple means for determining acceptable changes to data within a system that produces desirable results.

SUMMARY OF THE INVENTION

The present invention provides a rules change management method, comprising:

receiving by a first computing system comprising a first memory system, a set of meta-rules, said first memory system comprising a rules change management engine, said set of meta-rules associated with rules stored in a second memory system within a second computing system;

storing said set of meta-rules in said first memory system;

receiving by said first computing system, a request to change a rule of said rules;

applying, by said rules change management engine, at least one associated meta-rule of said set of meta-rules to said request; and determining, by said rules change management engine, if said request may be executed based on said applying.

The present invention provides a first computing system comprising a processor system coupled to a first computer-readable memory system, said first memory system comprising a rules change management engine, said rules change management engine comprising instructions that when executed by the processor system implements a rules change management method, said method comprising:

receiving by said first computing system, a set of meta-rules, said set of meta-rules associated with rules stored in a second computer-readable memory system within a second computing system;

storing said set of meta-rules in said first memory system;

receiving by said first computing system, a request to change a rule of said rules;

applying, by said rules change management engine, at least one associated meta-rule of said set of meta-rules to said request; and determining, by said rules change management engine, if said request may be executed based on said applying.

The present invention provides a computer program product, comprising a computer usable medium comprising computer readable code that when executed on a first computing system causes the first computing system to perform a rules change management method, said computer readable code comprising a rules change management engine, said method comprising:

receiving by said first computing system, a set of meta-rules, said set of meta-rules associated with rules stored in a memory system within a second computing system;

storing said set of meta-rules in said computer usable medium;

receiving by said first computing system, a request to change a rule of said rules;

applying, by said rules change management engine, at least one associated meta-rule of said set of meta-rules to said request; and determining, by said rules change management engine, if said request may be executed based on said applying.

The present invention provides a process for integrating computing infrastructure, comprising integrating computer-readable code into a first computing system, wherein said code comprises a rules change management engine, and wherein the code in combination with the first computing system is capable of performing a rules change management method comprising:

receiving by said first computing system, a set of meta-rules, said set of meta-rules associated with rules stored in a memory system within a second computing system;

storing said set of meta-rules in said first computing system;

receiving by said first computing system, a request to change a rule of said rules;

applying, by said rules change management engine, at least one associated meta-rule of said set of meta-rules to said request; and determining, by said rules change management engine, if said request may be executed based on said applying.

The present invention advantageously provides a system and associated method system for determining acceptable changes to data within a system that produces desirable results.

DETAILED DESCRIPTION OF THE INVENTION

Figure 1:
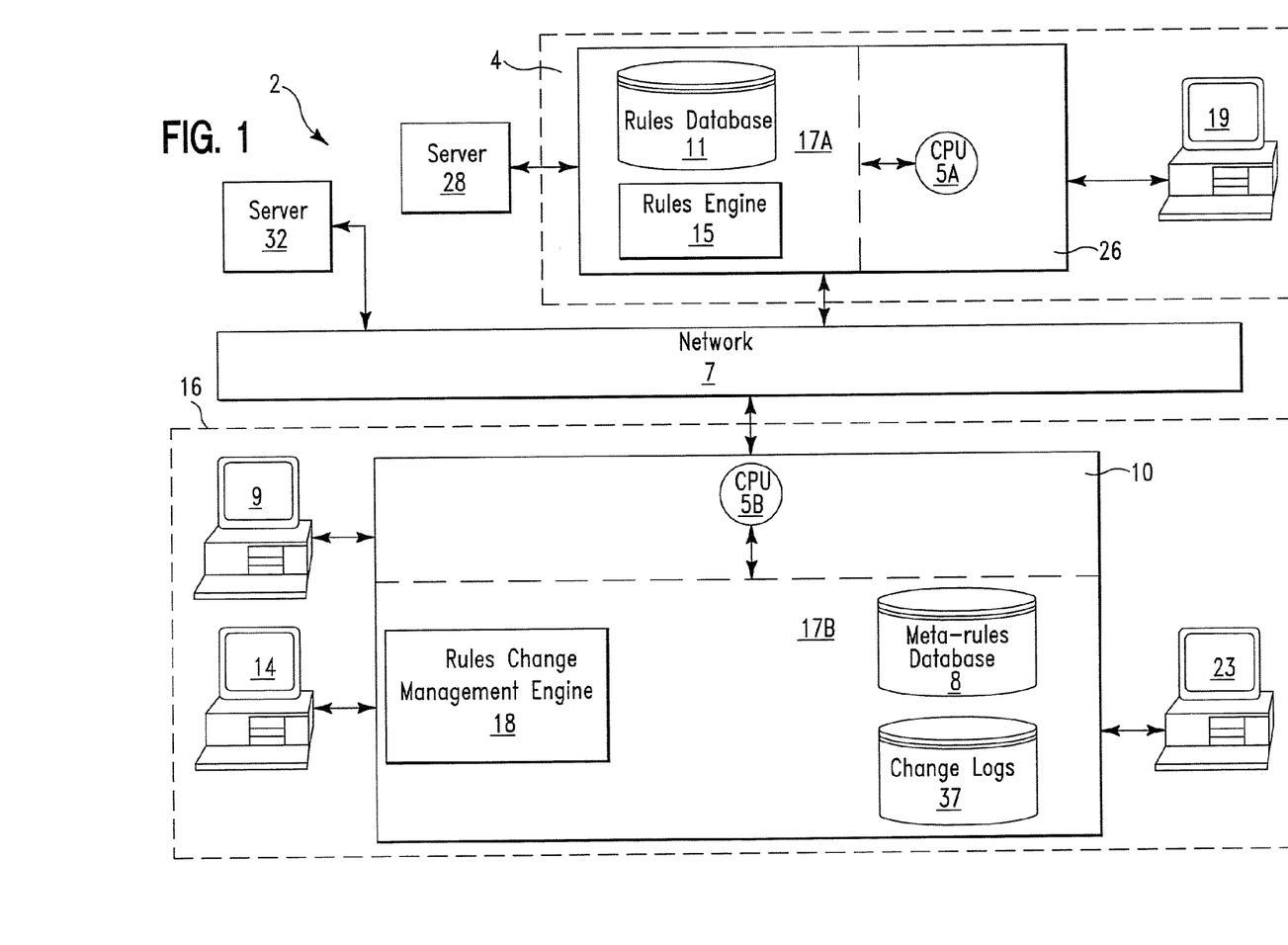
FIG. 1 illustrates a block diagram view of a system for managing changes to business rules, in accordance with embodiments of the present invention.

FIG. 1 illustrates a block diagram view of a system 2 for managing changes to business rules, in accordance with embodiments of the present invention. System 2 manages changes to business rules (e.g., see rules 11 database in FIG. 1) to avoid unforeseen side effects to business and IT systems controlled by these rules. A business rule (hereafter referred to as a rule) is defined herein to be a specific or general action in one or more business processes or systems to implement a policy or procedure of or related to the business. The expression of a rule comprises a relationship between an input and an output. Generally a rule can be expressed in a natural language such as English in the form of a conditional statement. For example a rule may comprise a monetary limit or boundary related to a product order, stating that "If sale value is less than $300,000, then perform all processing in an automated way, else do not perform all processing in an automated way." This rule states that the input (i.e., the value 300,000) is to be related to the output (i.e., the mode of processing). Implicitly, the rule comprises two input value ranges:

1. All values less than $300,000.
2. All values equal to or greater than $300,000.

Additionally, the rule comprises two implied output values:
1. Performing all processing in an automated way.
2. Do not perform all processing in an automated way.

In this example the rule defines the conditions under which different paths are to be taken in a business process.

A business may determine that a rule requires a change (e.g., adding a rule to a set of rules, removing a rule from a set of rules, changing a monetary limit or boundary of a rule, etc.). Changing a rule may cause an exploiting system (i.e., a computing system used by the business, such as server 28 and 32 in FIG. 1) to generate an error or unwanted behavior when the exploiting system executes the changed rule. Additionally, changing a rule may violate a governance process of the exploiting system or may cause testing of the exploiting system to detect a failure. An exploiting system is defined herein as a system (e.g., a server such as server 28 and 32) that invokes the rules engine and uses the rules' output that is returned by the rules engine to control its own processing.

System 2 specifies allowable changes to the rules immediately against boundary conditions for data referenced in the rules. Additionally, system 2 may invoke external validation of the requested changes to the rules by interacting with systems that can provide governance or testing results. The process for specifying allowable changes to the rules and validation of the requested changes is performed using one or more meta-rules (e.g., see meta-rules database 8 comprising meta-rules in FIG. 1) associated with the rules. A meta-rule is defined herein as a special rule that is associated with a specific rule or rules and states conditions that a change to the rule(s) must satisfy to be permitted. Note that there may be default meta-rules. For example, there could be a default meta-rule that states that no change is to be permitted to a rule, or one that states that any change is permitted to a rule, etc. Meta-rules may specify a range of values or an explicit set of values that are allowed for a given part of the rule. A meta-rule may specify that certain external validation is to be performed before the requested change can be put into production. For example, an external validation may comprise, inter alia, an approval by some human manager, regression testing that must be performed, etc. A regression test comprises retesting something that was successfully tested once, in order to catch any unanticipated errors that slipped in when a rule change was made in the system. Meta-rules may also specify, inter alia, allowable association of rules and rule groups, an order of execution of rules in a group, conditions under which completely new rules and rule sets may be created that apply to the same problem domain, governance or regulatory aspects such as business methods to be enforced for rules changes and approval process, etc. Note that multiple sets of meta-rules can be defined. A meta-rule may include information such as, inter alia, boundary conditions on parameters in a rule, allowable association of rules and rule groups, an order of execution of rules in a group of rules, conditions under which completely new rules and rule sets may be created, governance/regulatory aspects such as business methods to be enforced for rules changes and approval process, etc.

The system 2 comprises a computing system 4 connected to a computing system 16 through a network 7 and server 28 and/or server 32. Alternatively, computing system 4 and computing system 16 may be part of a same computing system. The computing system 4 comprises a computing apparatus 26 and an administrator computer 19. The computing apparatus 26 comprises a CPU 5A and a memory structure 17A. The memory structure 17A comprises a rules engine 15 and rules in a rules database 11 (hereafter referred to as rules). The rules engine 15 comprises a software tool for deriving, based on the data that matches the premises of the rules, the conclusions to be drawn from the rules. The rules engine 15 is also capable of acting as an intelligent agent on behalf of a rules administrator (i.e., a party that uses the rules engine's interface (i.e., administrator computer 19) to store rules and perform other management of the rules engine 15). The administrator computer 19 uses an interface to the rules engine 15 and is used by an individual(s) to specify and enter the rules into the rules database 11 within computing apparatus 26. Server 28 (i.e., an exploiting system) is connected to and located in a same general location (e.g., a same building, etc.) as computing apparatus 26. Server 28 is directly connected to computing apparatus 26. Server 32 (i.e., an exploiting system) is connected to computing apparatus 26 through network 7 and may be in a remote location. Note that system 2 may comprise server 28 and/or server 32. Network 7 may comprise any type of network including, inter alia, wide area network (WAN), a LAN, the Internet, etc. The computing system 16 comprises a computing apparatus 10, a test execution computer 23, a governance approval computer 14, and an administrator computer 9. The computing apparatus 10 comprises a CPU 5B and a memory structure 17B. The memory structure 17B comprises a rules change management engine 18, meta-rules within a meta-rules database 8 (hereafter referred to as meta-rules), and a rules change log 17. The rules change management engine 18 comprises a software tool responsible for managing requested changes for the rules. As preparation for any change to rules, meta-rules are inputted into system 16, through the administrator computer 9, into the meta-rule database 8. After that preparation step, when a rules administrator using the administrator computer 9 to request a change to a rule from the rules database 11, the rules change management engine 18 acts as an intelligent agent for the rules administrator, executing the meta-rules from the meta-rules database 8 that are associated with the rule and checking the results, including the invocation of any external validation for the rule change and that validation's results, deciding based on the overall results whether the requested rule change may be safely made, and, if the rule change may be safely made, interfacing to the rules engine 15 to make the rule change.

In response to a requested rule change, the rules change management engine 18 executes an algorithm (see FIG. 3) to approve/execute or deny the rule change according to the meta-rules. The rules change management engine 18 reports any results of this process (i.e. accepted valid rule changes, rejected invalid rule changes, identification of the meta-rule that led to acceptance or rejection, etc) and generates rules change log 37 comprising the results for history and audit purposes. Meta-rules from meta-rules database 8 may comprise, inter alia, parameters for rules, values that parameters may take (e.g., values may be listed explicitly or by means of ranges, values, or data types), a relative priority for each of the rules with respect to each other, conditions under which completely new rules and rule sets may be created, evaluation of a rule change request which must be performed by a party external to the rules change management engine (e.g., using governance computer 14 or test computer execution 23), etc. The meta-rules are inputted into the computing apparatus 10 through the administrator computer 9. The administrator computer 9 must additionally be used by a party submitting a request to change one or more of the rules 11. Upon submission of a request to change a rule(s), the rules change management engine 18, using a meta-rule, executes the necessary logic to perform an execution or denial of the rule change. The rules change management engine 18 notifies the requesting party of the results of the change request through the administrator computer 9. Additionally, the rules change management engine 18 generates rules change log 17 comprising the results. If the request is approved (i.e., request is allowed according the meta-rules), then the rules change management engine 18 executes the request and the rule(s) is changed according to the request. Alternatively, a request to change a rule that has been approved by the rules change management engine 18 according to the meta-rules may require an additional approval step before the request is executed and the rule is changed. As a first example, a governance party (i.e., using governance computer 14) may be required for additional approval for the request to change the rule. As a second example, a procedure may be required for testing an effect of a rule change on the exploiting system prior to approving the request to change the rule.

Figure 2:
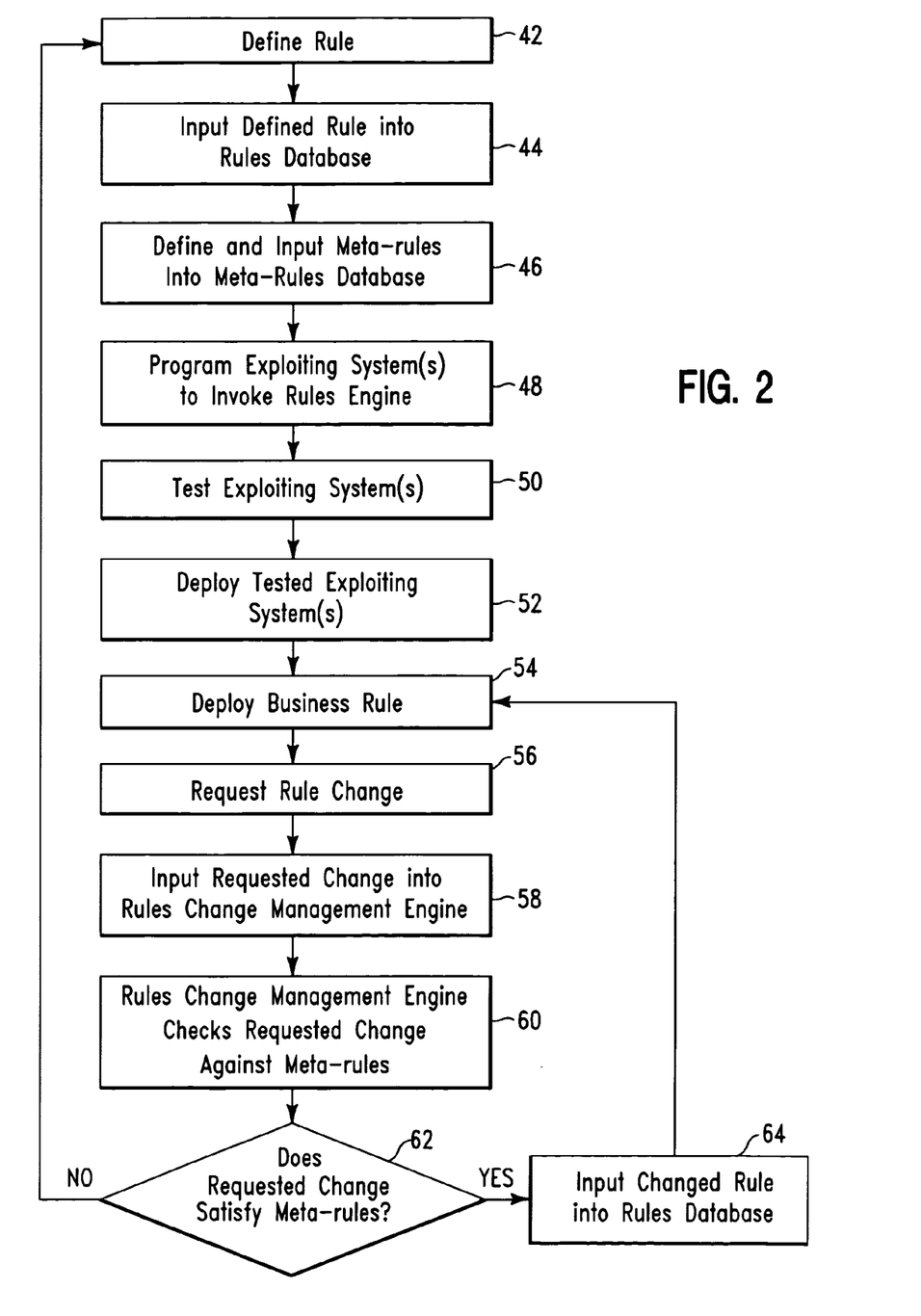
FIG. 2 is a flowchart illustrating an algorithm describing a process for changing a rule in the system of FIG. 1, in accordance with embodiments of the present invention.

FIG. 2 is a flowchart illustrating an algorithm describing a process for changing a rule in the system 2 of FIG. 1, in accordance with embodiments of the present invention. In step 42, a business defines a rule. People who are responsible for the functioning of the business itself formulate a rule describing how they want their business to function. The rule may be stated in a natural language, such as English, and in that form is intended for communication between people. For example, the business might define the following rule: "If the value of a sale is less than $300,000, then all processing shall be on-line and automated". The rule may be a directive from management to the rest of the business as the result of a decision by management to reduce costs by reducing manual processing of orders. In step 44, the rules administrator uses computer 19 to input the defined rule into the rules database 11. The rule stated in a natural language must be restated using a syntax required by the rules engine 15, to enable the rules engine 15 to execute the rule and provide output in a format applicable to any exploiting system. For example, the rule given as in the example above may comprise the following syntax:

if order-val lt 300000 then return 'auto' else return null;

Therefore, if the input variable "order-val" has a value that is less than 300,000, then the rules engine 15 is to return as output the character string "auto" to the caller and in any other case it is to return the "null" string. In step 46, the meta-rules administrator defines and inputs meta-rules (i.e., associated with the rule) in the meta-rules database 8. In order to define associated meta-rules, an individual or party must study the rule, interview business people on how they foresee changes to it over time, and formulate the meta-rule(s) that will determine what changes may be made to the rule once it has been deployed to a production environment. For example, two meta-rules might be defined for the rule given as an example above, as follows:

order-val between min 250000 max 1000000;
external-validation (approval, "order-val");

This syntax is intended to represent that the value "order-val" in the rule must always be compared with a value between 250,000 and 1,000,000, and, additionally, before any change to the rule may be made, an external validation step must be performed by calling an "approval" service and passing the "order-val" string to the "approval" service. The "approval" service may have access to the name of a set of one or more approvers to which the "approval" service must send a record of the requested rule change. Additionally, the "approval" service must wait for a positive response and return it to the rules change management engine 18 before the rules change management engine makes the requested rule change. In step 48, exploiting systems such as server 28 and/or server 32 are programmed to use the rule. The exploiting systems are not required to be programmed based on a direct knowledge of the rule, but the exploiting systems are required to communicate with a rules engine 15 to inquire what conclusions the rules engine draws based on a specific rule or a set of rules known to it and based on the input data passed as input from the exploiting systems. Therefore, the programmers responsible for programming the exploiting systems program the exploiting systems to pass that inquiry and input and use the conclusion drawn from the rule. For example, the rules engine 15 may provide a Java programming language client, as a means for hiding a complexity of interactions with the rules engine 15 and for making the interactions with the rules engine appear to the exploiting system as local method calls. In this example, an exploiting system could have the following statement:

myorder.setOrderPath(myorder.value);

The statement "myorder.setOrderPath(myorder.value);" merely appears as a call to the setOrderPath method of the myorder object, passing it the value of the order. Ultimately, the statement "myorder.setOrderPath(myorder.value);" results in an invocation of the rules engine 15 to process any rules that use that value as input and to derive a conclusion from it. In step 50, the exploiting systems are tested in conjunction with the rules engine and its database of rules, and also the rules change management engine and its database of associated meta-rules. For example, testing the rule may include testing at least one case where the order value passed from the exploiting systems to the rules engine 15 is less than 300,000 and at least one case where the order value is equal to or greater than 300,000. Additionally, changes to the rule must be tested based on the meta-rules. For example, the two meta-rules defined for the rule stated above may required the four following tests:

Test 1 comprises trying to change the rule to use some values less than 250,000 (e.g., so the example rule now reads "if order-val lt 250000 then return 'auto' else return null") and verifying that the rules change management engine 18 will reject the change due to the first meta-rule.

Test 2 comprises trying to change the rule to use a value greater than 1,000,000 (e.g., if order-val gt 1000000 then return 'auto' else return null) and verifying that the rules change management engine 18 will reject the rule change.

Test 3 comprises trying to change the rule to use values between 250,000 and 1,000,000 (e.g., if order-val between min 250000 max 1000000 then return 'auto' else return null), which the rules change management engine 18 will accept, but then having the external approval step return a rejection of the rule change. Test 3 will verify that the rules change management engine 18 will reject the change based on the second meta-rule (i.e., the external approval step).

Test 4 comprises trying to change the rule to use some values between 250,000 and 1,000,000, as in test 3 above and having the external approval step succeed. Test 4 will verify that the rules change management engine 18 accepts the changed rule and that the exploiting systems function correctly after the change. Test 4 may entail more test case variants where the value of the order being processed is first less than 500,000 and then equal to or greater than 500,000 to verify that the rules engine 15 returns, respectively, "auto" and the null string. In step 52, successfully tested exploiting systems are deployed as production systems. In step 54, the rule defined in step 42 is deployed so that the production instances of the exploiting systems are able to access the rule. In the example used in this application, the production instance of an exploiting system, such as an order management system, will obtain an indication to perform its processing in fully automated mode or not according to the conditions specified in the rule. If additional exploiting systems (i.e., ones other than servers 28 and 32 shown in FIG. 1) are later deployed and access the rules engine 15, the additional exploiting systems will obtain the same conclusion from the rules engine 15 under the same circumstances. In step 56, the business(es) using the exploiting systems attempts to change the rule. For example, if the business(es) have found that fully automated processing of certain orders has been successful and reduces costs, they may decide to set the threshold order value higher (i.e., higher than 300,000) to handle more orders via fully automated processing. In step 58, the rules administrator inputs the requested change to the rule into the rules change management engine 18 which acts as the intelligent agent of the rules administrator. In step 60, the rules change management engine 18 uses the meta-rules to check if the requested change to the rule is allowed. The rules change management engine 18 functions to execute the meta-rules against the requested change to the rule. In step 62, the requested change to the rule is checked to determine if the requested change to the rule conforms to the meta-rules. If in step 62, it is determined that the requested change to the rule conforms to the meta-rules and any required external validation then in step 64 the rules change management engine 18 inputs the changed rule into the rules database 11 and step 54 is repeated. If in step 62, it is determined that the requested change to the rule does not conform to the meta-rules and/or any required external validation steps then the rule is not changed; in this case, the business can change the rule only if it inputs the new form of the rule into the rules database 11 just as if it were a brand new rule and steps 44 through 52 are repeated.

Figure 3:
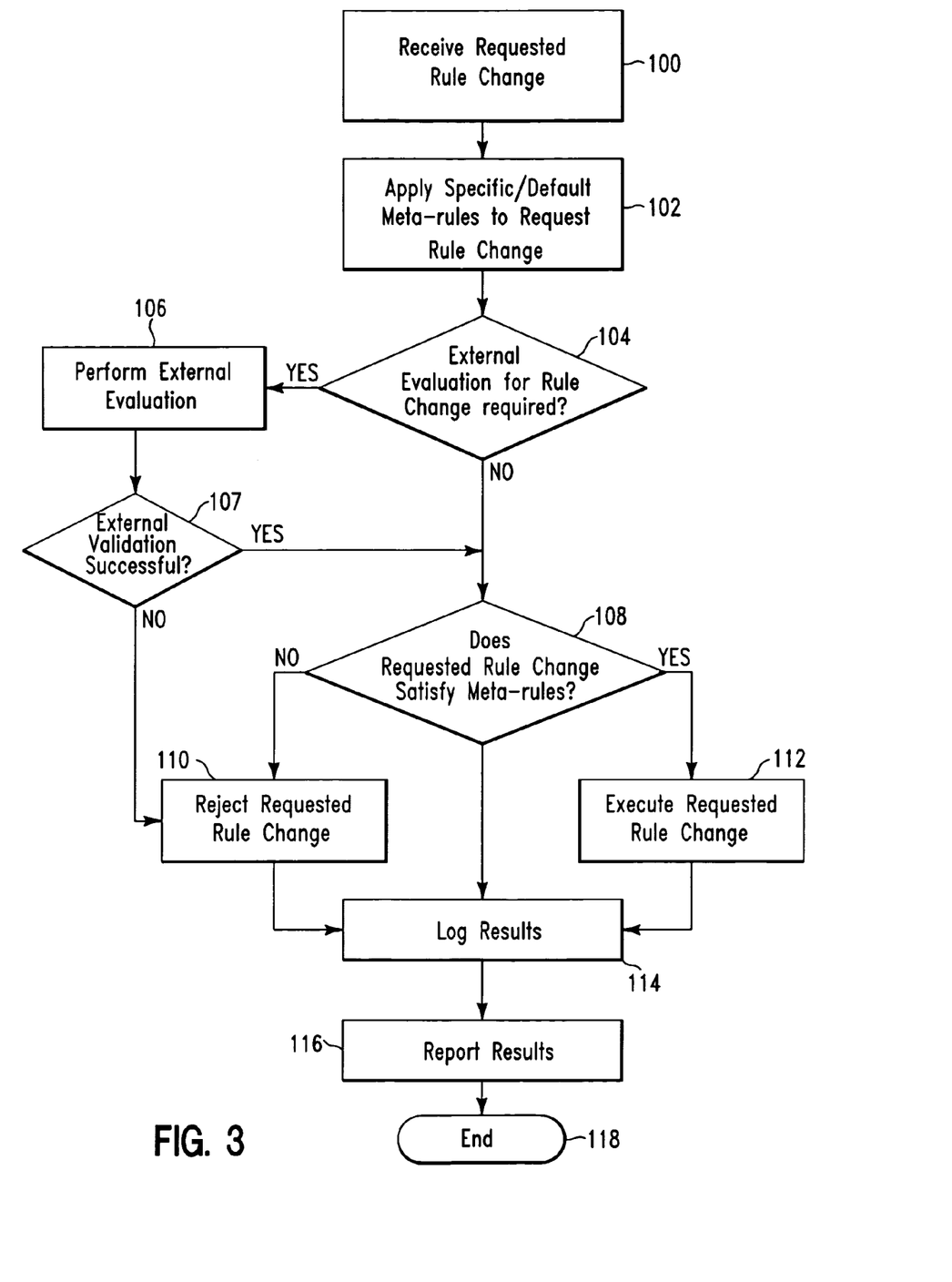
FIG. 3 is a flowchart illustrating an algorithm describing a process used by the rules change management engine of FIG. 1, in accordance with embodiments of the present invention.

FIG. 3 is a flowchart illustrating an algorithm describing a process used by the rules change management engine 18 of FIG. 1, in accordance with embodiments of the present invention. In step 100, a requested change for a rule is received by the rules change management engine 18. In step 102, the rules change management engine 18 retrieves from the meta-rules database 8, any meta-rules (including any default meta-rules) that are associated with the rule comprising the requested change. The meta-rules are applied to the requested rule change. In step 104, the rules change management engine 18 checks the meta-rules to determine if an evaluation of the rule change must be performed by a party external to the direct meta-rules processing (e.g., approval by a human party, or other governance actions).

If in step 104, it is determined that the requested change to the rule requires an external evaluation, then in step 106 an external evaluation of the rule change is performed. In step 107, it is determined if the rule change is allowed according to the external evaluation. If in step 107, it is determined that the requested change to the rule is not allowed according to the external evaluation then the requested rule change is rejected in step 110, logged as a report in step 114, and reported to the party that requested the rule change in step 116. The process is terminated in step 118. If in step 107, it is determined that the requested change to the rule is allowed according to the external evaluation then the process executes step 108 as described, infra.

If in step 104, it is determined that the requested change to the rule does not require an external evaluation, then in step 108 it is determined if the requested change to the rule satisfies any remaining associated meta-rules. If in step 108, it is determined that the requested change to the rule is not allowed according to the remaining associated meta-rules, then the requested rule change is rejected in step 110, logged as a report in step 114, and reported to the party that requested the rule change in step 116. The process is terminated in step 118. If in step 108, it is determined that the requested change to the rule is allowed according to the remaining associated meta-rules then the requested rule change is executed in step 112, logged as a report in step 114, and reported to the party that requested the rule change in step 116. The process is terminated in step 118.

Figure 4:
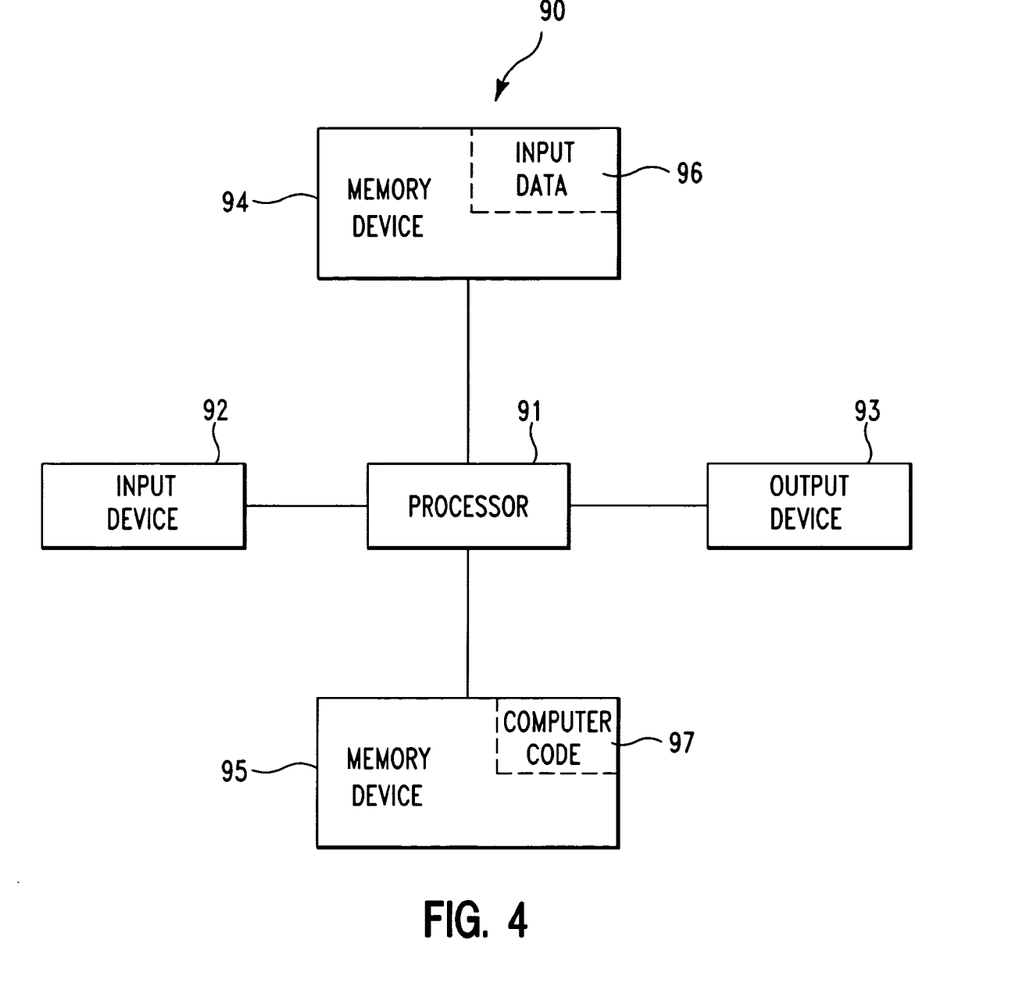
FIG. 4 illustrates a computer system for implementing a management system for changing business rules, in accordance with embodiments of the present invention.

FIG. 4 illustrates a computer system 90 representing computing system 4, computing system 16, or any combination thereof, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen (e.g., monitor 110), a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm (i.e., algorithms from FIGS. 2 and 3) used for managing changes to rules. The processor 91 executes the computer code 97. The memory device 94 includes input data 96. The input data 96 includes input required by the computer code 97 (e.g. business rules in rules engine format, meta-rules in rules change management format). The output device 93 displays output from the computer code 97. Either or both memory devices 94 and 95 (or one or more additional memory devices not shown in FIG. 5) may comprise any of the algorithms of FIGS. 1 and 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method for managing changes to rules.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:
1. A rules change management method, comprising:
receiving by a first computing system comprising a first computer processor and a first memory system, a set of meta-rules, wherein said first memory system comprises a rules change management engine, wherein said set of meta-rules is associated with rules stored in a second memory system within a second computing system comprising a second computer processor, wherein said meta-rules comprise conditions that must be satisfied before any change within each rule of said rules is permitted, wherein said conditions comprise allowable changes within each said rule against boundary conditions for parameters and data referenced within each said rule, wherein said changes are associated with changing a monetary limit and a boundary within each said rule, and wherein said meta-rules comprise additional conditions under which completely new rule sets may be created;

storing said set of meta-rules in said first memory system;

receiving by said first computing system from a rules administrator party via an administrator computer interface terminal, a first request to generate changes within a rule of said rules;

applying, by said rules change management engine, at least one associated meta-rule of said set of meta-rules to said first request, wherein said applying comprises first applying a first meta-rule of said set of meta-rules to a first portion within said rule and second applying a second meta-rule of said set of meta-rules to a second portion within said rule, wherein said first portion differs from said second portion, wherein said first meta-rule comprises a first explicit set of values allowable for said first portion, and wherein said second meta-rule comprises a differing second explicit set of values allowable for said second portion;

determining, by said first computer processor, if said request may be executed based on said applying, wherein said determining has determined that said first request may be executed based on said applying, wherein said first computer processor executes said rules change management engine to perform said determining;

identifying, by said first computing system, said at least one associated meta-rule;

transmitting, by said first computing system to an external validator, a second request for an evaluation of said first request, wherein said external validator comprises a human manager;

evaluating by said external validator in response to said second request, said first request;

deciding by said external validator, if said first request should be approved based on said evaluating;

performing, by said first computing system, a regression test to determine if said first request should be approved;

generating, by said first computing system, a rule change log report, wherein said rules change log report comprises results associated with said determining and results of said identifying;

storing, by said first computing system, said rule change log report; and listing, by said first computing system, said first explicit set of values and said second explicit set of values.

2. The method of claim 1, further comprising:

executing by said rules change management engine, said first request;

changing, first boundary conditions for parameters and data referenced within said rule in response to said executing; and storing said changed rule in said second memory system.

3. The method of claim 1, further comprising:

denying by said rules change management engine, said first request; and maintaining, said rule in response to said denying.

4. The method of claim 1, wherein said deciding has determined that said first request may be approved based on said evaluating, and wherein said method further comprises:

approving by said external validator, said first request;

executing by said rules change management engine, said first request;

changing, said rule in response to said executing; and storing said changed rule in said second memory system.

5. The method of claim 1, wherein said deciding has determined that said first request may not be approved based on said evaluating, and wherein said method further comprises:

denying by said external validator, said first request; and maintaining, said rule in response to said denying.

6. The method of claim 1, wherein said first computing system and said second computing system are part of a same computing system.

7. The method of claim 1, wherein said first applying indicates that said first request may be executed, wherein said second applying indicates that said first request may not be executed, and wherein said determining has determined that said first request may be not executed based on said second applying.

8. The method of claim 1, wherein said first applying indicates that said first request may be executed, wherein said second applying indicates that said first request may not be executed, and wherein said determining has determined that said first request may be executed based on said first applying.

9. The method of claim 1, wherein said at least one associated meta-rule may specifies that said external validation is required before said determining, and wherein said method further comprises:

receiving, by said rules change management engine from said user, validation that said first request may be executed.

10. The method of claim 1, wherein said at least one associated meta-rule may specifies that external validation from a regression test is required before said determining, and wherein said method further comprises:

executing, by said rules change management engine, said regression test;

receiving, by said rules change management engine from results of said executed regression test, validation that said first request may be executed.

11. The method of claim 1, wherein said rules comprise monetary limits associated with product orders.

12. The method of claim 1, wherein said meta-rules comprise a condition stating that there is no change permitted to at least one rule of said rules.

13. The method of claim 1, wherein said meta-rules comprise a condition stating an allowable association between least one rule of said rules and a rule group.

14. The method of claim 1, wherein said meta-rules comprise conditions under which completely new rules and rule sets may be created that apply to a same problem domain.

15. The method of claim 1, wherein said meta-rules comprise a meta-rule specifying a relative priority of each rule of said rules with respect to each other rule of said rules.

16. The method of claim 1, further comprising:

performing, by said first computing system, a regression test to determine if said first request should be approved.

17. The method of claim 1, further comprising:

executing by said rules change management engine, said first request;

changing in response to said executing, conditions under which new rules and rule sets may be created that apply to a same problem domain;

creating said new rules and rule sets; and storing said new rules and rule sets.

18. A first computing system comprising a first computer processor coupled to a first computer-readable memory system, said first memory system comprising a rules change management engine, said rules change management engine comprising instructions that when executed by the first computer processor implements a rules change management method, said method comprising:

receiving by said first computing system, a set of meta-rules, wherein said set of meta-rules is associated with rules stored in a second memory system within a second computing system, wherein said meta-rules comprise conditions that must be satisfied before any change within each rule of said rules is permitted, wherein said conditions comprise allowable changes within each said rule against boundary conditions for parameters and data referenced within each said rule, wherein said changes are associated with changing a monetary limit and a boundary within each said rule, and wherein said meta-rules comprise additional conditions under which completely new rule sets may be created;

storing said set of meta-rules in said first memory system;

receiving by said first computing system from a rules administrator party via an administrator computer interface terminal, a first request to generate changes within a rule of said rules;

applying, by said rules change management engine, at least one associated meta-rule of said set of meta-rules to said first request, wherein said applying comprises first applying a first meta-rule of said set of meta-rules to a first portion within said rule and second applying a second meta-rule of said set of meta-rules to a second portion within said rule, wherein said first portion differs from said second portion, wherein said first meta-rule comprises a first explicit set of values allowable for said first portion, and wherein said second meta-rule comprises a differing second explicit set of values allowable for said second portion;

determining, by said first computer processor, if said request may be executed based on said applying, wherein said determining has determined that said first request may be executed based on said applying, wherein said first computer processor executes said rules change management engine to perform said determining;

identifying, by said first computing system, said at least one associated meta-rule;

transmitting, by said first computing system to an external validator, a second request for an evaluation of said first request, wherein said external validator comprises a human manager;

evaluating by said external validator in response to said second request, said first request;

deciding by said external validator, if said first request should be approved based on said evaluating;

performing, by said first computing system, a regression test to determine if said first request should be approved;

generating, by said first computing system, a rule change log report, wherein said rules change log report comprises results associated with said determining and results of said identifying;

storing, by said first computing system, said rule change log report; and listing, by said first computing system, said first explicit set of values and said second explicit set of values.

19. The computing system of claim 18, wherein said method further comprises:

executing by said rules change management engine, said first request;

changing, first boundary conditions for parameters and data referenced within said rule in response to said executing; and storing said changed rule in said second memory system.

20. The computing system of claim 18, wherein said deciding has determined that said first request may not be approved based on said evaluating, and wherein said method further comprises:

denying by said external validator, said first request; and maintaining, said rule in response to said denying.

21. A computer program product, comprising a computer readable medium comprising computer readable code that when executed on a first computer processor of a first computing system causes the first computing system to perform a rules change management method, said computer readable code comprising a rules change management engine, said method comprising:

receiving by said first computing system, a set of meta-rules, wherein said set of meta-rules is associated with rules stored in a second memory system within a second computing system, wherein said meta-rules comprise conditions that must be satisfied before any change within each rule of said rules is permitted, wherein said conditions comprise allowable changes within each said rule against boundary conditions for parameters and data referenced within each said rule, wherein said changes are associated with changing a monetary limit and a boundary within each said rule, and wherein said meta-rules comprise additional conditions under which completely new rule sets may be created;

storing said set of meta-rules in said first memory system;

receiving by said first computing system from a rules administrator party via an administrator computer interface terminal, a first request to generate changes within a rule of said rules;

applying, by said rules change management engine, at least one associated meta-rule of said set of meta-rules to said first request, wherein said applying comprises first applying a first meta-rule of said set of meta-rules to a first portion within said rule and second applying a second meta-rule of said set of meta-rules to a second portion within said rule, wherein said first portion differs from said second portion wherein said first meta-rule comprises a first ex licit set of values allowable for said first portion, and wherein said second meta-rule comprises a differing second explicit set of values allowable for said second portion;

determining, by said first computer processor, if said request may be executed based on said applying, wherein said determining has determined that said first request may be executed based on said applying, wherein said first computer processor executes said rules change management engine to perform said determining;

identifying, by said first computing system, said at least one associated meta-rule;

transmitting, by said first computing system to an external validator, a second request for an evaluation of said first request, wherein said external validator comprises a human manager;

evaluating by said external validator in response to said second request, said first request;

deciding by said external validator, if said first request should be approved based on said evaluating;

performing, by said first computing system, a regression test to determine if said first request should be approved;

generating, by said first computing system, a rule change log report, wherein said rules change log report comprises results associated with said determining and results of said identifying;

storing, by said first computing system, said rule change log report; and listing, by said first computing system, said first explicit set of values and said second explicit set of values.

22. The computer program product of claim 21, wherein said method further comprises:

executing by said rules change management engine, said first request;

changing, first boundary conditions for parameters and data referenced within said rule in response to said executing; and storing said changed rule in said second memory system.

23. The computer program product of claim 21, wherein said method further comprises:

denying by said rules change management engine, said first request; and maintaining, said rule in response to said denying.

24. The computer program product of claim 21, wherein said deciding has determined that said first request may be approved based on said evaluating, and wherein said method further comprises:

approving by said external validator, said first request;

executing by said rules change management engine, said first request;

changing, said rule in response to said executing; and storing said changed rule in said second memory system.

25. The computer program product of claim 21, wherein said deciding has determined that said first request may not be approved based on said evaluating, and wherein said method further comprises:

denying by said external validator, said first request; and maintaining, said rule in response to said denying.

26. A process for integrating computing infrastructure, comprising integrating computer-readable code into a first computing system comprising a first computer processor, wherein said code comprises a rules change management engine, and wherein the code in combination with the first computing system is capable of performing a rules change management method comprising:

receiving by said first computing system, a set of meta-rules, wherein said set of meta-rules is associated with rules stored in a second memory system within a second computing system, wherein said meta-rules comprise conditions that must be satisfied before any change within each rule of said rules is permitted, wherein said conditions comprise allowable changes within each said rule against boundary conditions for parameters and data referenced within each said rule, wherein said changes are associated with changing a monetary limit and a boundary within each said rule, and wherein said meta-rules comprise additional conditions under which completely new rule sets may be created;

storing said set of meta-rules in said first memory system;

receiving by said first computing system from a rules administrator party via an administrator computer interface terminal, a first request to generate changes within a rule of said rules;

applying, by said rules change management engine, at least one associated meta-rule of said set of meta-rules to said first request, wherein said applying comprises first applying a first meta-rule of said set of meta-rules to a first portion within said rule and second applying a second meta-rule of said set of meta-rules to a second portion within said rule, wherein said first portion differs from said second portion, wherein said first meta-rule comprises a first explicit set of values allowable for said first portion, and wherein said second meta-rule comprises a differing second explicit set of values allowable for said second portion;

determining, by said first computer processor, if said request may be executed based on said applying, wherein said determining has determined that said first request may be executed based on said applying, wherein said first computer processor executes said rules change management engine to perform said determining;

identifying, by said first computing system, said at least one associated meta-rule;

transmitting, by said first computing system to an external validator, a second request for an evaluation of said first request, wherein said external validator comprises a human manager;

evaluating by said external validator in response to said second request, said first request;

deciding by said external validator, if said first request should be approved based on said evaluating;

performing, by said first computing system, a regression test to determine if said first request should be approved;

generating, by said first computing system, a rule change log report, wherein said rules change log report comprises results associated with said determining and results of said identifying;

storing, by said first computing system, said rule change log report; and listing, by said first computing system, said first explicit set of values and said second explicit set of values.

27. The process of claim 26, wherein said method further comprises:

executing by said rules change management engine, said first request;

changing, first boundary conditions for parameters and data referenced within said rule in response to said executing; and storing said changed rule in said second memory system.

28. The process of claim 26, wherein said method further comprises:

denying by said rules change management engine, said first request; and maintaining, said rule in response to said denying.

29. The process of claim 26, wherein said deciding has determined that said first request may be approved based on said evaluating, and wherein said method further comprises:

approving by said external validator, said first request;

executing by said rules change management engine, said first request;

changing, said rule in response to said executing; and storing said changed rule in said second memory system.

30. The process of claim 26, wherein said deciding has determined that said first request may not be approved based on said evaluating, and wherein said method further comprises:

denying by said external validator, said first request; and maintaining, said rule in response to said denying.

* * * * *